United States Patent Office 3,471,407
Patented Oct. 7, 1969

3,471,407
SEWER AND DRAIN CLEANER COMPOSITION
Samuel Spring, Atlanta, Ga., assignor, by mesne assignments, to Consolidated Foods Corporation, a corporation of Maryland
No Drawing. Filed Jan. 20, 1966, Ser. No. 521,798
Int. Cl. C11d 7/10; B08b 9/06
U.S. Cl. 252—157                                                   6 Claims

ABSTRACT OF THE DISCLOSURE

A heat producing drain cleaner composition characterized by a spherical pelletized form wherein each pellet contains a representative proportion of each component of the composition and wherein the composition utilized comprises approximately 45% to 65% alkali metal hydroxide, 5% to 10% particulate aluminum, and 20% to 30% water-soluble inorganic nitrate.

---

This invention relates generally to a heat-producing composition and article and more particularly to an improved particulate composition adapted to develop heat when added to water to clear an impediment from a sewer, drain line and the like. More specifically the composition comprises a plurality of pellets which are substantially homogeneous and comprise an admixture of an alkali metal hydroxide, a particulate aluminum, and an oxidizer such as a water-soluble inorganic nitrate together with optional catalytic agents, inert carriers or fillers such as copper sulfate, sodium chloride, sodium carbonate, sodium silicate, etc.

Heterogeneous chemical compositions of the general nature set forth above have long been in use as drain cleaners. Frequently in the course of shipment of such compositions known heretofore it frequently develops that the relatively fine particulate materials segregate through the coarser particles and accumulate at the bottom of the container. In addition, the relatively heavy aluminum and sodium nitrate also have a tendency to segregate out of the mixture. When such a drain cleaner composition is introduced into the residual water in a drain line trap or at a point removed from the side of an impediment, the caustic tends to dissolve rapidly, therefor dissipating a part of the heat generated before the composition reaches the site of the impediment. Furthermore, due to the segregation of the several particulate components of the composition the reaction may or may not generate the desired maximum heat and gas depending upon the manner in which the individual particulate components dissolve in the water and come in contact at proper predetermined concentrations. Accordingly, the segregation of the particular components and the premature reaction of the caustic definitely limit the effectiveness of many drain cleaner compositions known heretofore.

As is well known, when drain cleaner compositions of the general formulation set forth above are placed in water, the water-soluble components dissolve and react with the aluminum, generating large quantities of heat and ammonia gas. If improperly formulated or if components have separated, hydrogen gas is developed which is of course undesirable due to the explosive nature of hydrogen and oxygen admixtures.

The aluminum and sodium nitrate have a tendency to separate, the former particularly because it is more dense than the other components, thus giving rise to a number of problems one of which is the fact that the separation of the mixture results in a paucity of aluminum in some portions, with attendant inadequate reaction of the composition in use, while in other portions of the composition the excess aluminum could cause hydrogen generation, thereby substantially reducing the effectiveness of the composition. A further problem is that the reaction of caustic and water, etc. near the surface of the body of water can be of such violence that the highly caustic solution is spattered onto the body of the person utilizing the composition so as to cause chemical burns of a serious nature.

As may be observed from the prior art a number of attempts have been made to produce sewer and drain cleaner compositions of the general nature described which are characterized by particular physical configurations or chemical formulations which are presumably adapted to overcome the aforementioned difficulties normally encoutered with the manufacture, distribution and utilization of drain cleaner compositions. However, such attempts to overcome the problems set forth have generally not been entirely satisfactory when considered from the standpoint of the practicality of the manufacture of the drain cleaner composition or from the standpoint of the ease of utilization and effectiveness thereof.

It is therefore an object of the present invention to provide a drain cleaner composition in highly improved physical form, whereby undesired segregation of the several particulate components comprising the composition is avoided during shipment, storage and utilization thereof.

It is another object of the present invention to provide a drain cleaner composition in highly improved physical form wherein all the components of the product are homogeneously distributed throughout the individual particles of the drain cleaner composition so as to avoid segregation, caking and/or dusting thereof.

A further object of the present invention is to provide a drain cleaner in highly improved physical form, namely, pelletized, whereby the delay or induction period of the reaction of the several components of the composition with each other and the water present at the site of a drain line impediment is provided before high temperatures and significant generation of gas are developed so that flashback, or boiling of the chemical solution onto the person utilizing the composition is avoided.

A still further object of the present invention is to provide a drain cleaner composition in highly improved physical form so as to insure that a substantial portion of the homogeneous pellets reach the site of an impediment within a drain line, trap, and the like before any significant generation of heat and gas takes place thereby increasing the effctiveness of the composition of the present invention in terms of the objective of its use, namely, breaking up of the impediment in the drain line.

Still a further object of the present invention is to provide a drain cleaner composition in highly improved physical form, namely in pelletized form, wherein each pellet has a substantially homogeneous formulation so as to include representative proportions of each and every component of the over-all composition utilized to form the pellets.

Still a further object of the present invntion is to provide a drain cleaner composition in highly improved physical form wherein the induction period of the in situ reaction of the composition to clear a drain line of an impediment may be selectively controlled by the configuration and mesh size of the individual homogeneous pellets.

Still a further object of the present invention is to provide a sewer and drain cleaner composition in highly improved physical form which does not tend to form a relatively insoluble cake of product adjacent the site of an impediment within a sewer or drain line due to the pelletized, preferably spherical, configuration of the drain cleaner of the present invention.

Further aspects of the invetnion will become apparent from the following discussion.

In accordance with the present invention the aforementioned objects are accomplished by providing a drain cleaner chemical which is preferably in the form of generally spherical pellets or balls each of which contains a representative proportion of each of the several components of the composition. Because of the uniform distribution of components in the pellets it is possible to use a broader range of chemical compositions than generally possible with heterogeneous compositions or drain cleaner compositions where the metallic component is incorporated into a molten caustic in an attempt to improve the distribution of the metallic component throughout the individual particles of the composition. Thus, although a concentration of from about 30% to 35% sodium nitrate is generally required to avoid the generation of any uncombined hydrogen gas when a heterogeneous drain cleaner composition is manufactured, in the practice of the present invention the proportion of sodium nitrate may be reduced to about 20% when the composition is pelletized. The reduction of the concentration of the sodium nitrate below that normally contemplated in drain cleaner compositions known heretofore is beneficial inasmuch as the sodium nitrate detracts from the effectiveness of the sewer chemical because it absorbs heat upon going into solution, however, it will be appreciated that it is imperative to incorporate a certain proportion of sodium nitrate in the composition to insure oxidation of free hydrogen gas which would otherwise be released. Furthermore, the improved physical form of drain cleaner set forth in the present invention permits substitution of other salts for part of the sodium nitrate by facilitating the utilization of less costly compounds or of salts that are exothermic, such as sodium carbonate for example thereby facilitating the generation of additional heat during utilization of the composition.

The pelletizing of the several active components comprising the drain cleaner composition of the present invention namely the heat-producing ingredients, such as aluminum and an alkali metal hydroxide such as sodium hydroxide, potassium hydroxide, etc., an oxidizing agent such as a water-soluble inorganic nitrate such as sodium nitrate, and inert carriers, fillers or other somewhat exothermic salts such as sodium chloride, sodium carbonate, sodium silicate, etc. will require that the components go into a plastic state, following which a rolling action causes the materials to ball up into pellets. Inasmuch as the method of forming the pellets does not comprise the inventive concept disclosed herein, a further discussion of the specific method of pelletizing the several components into generally homogeneous spherical pellets of varying size is not considered to be necessary.

Although not critical, the caustic preferably utilized is the so-called crystal or ground caustic which is commercially available, however flakes or granules may also be utilized. In addition, with regard to the sizing and form of the sodium nitrate utilized, the best results are generally obtained by utilizing nitrate prills such as those which are commercially available in a size range of approximately $\frac{1}{16}''$ to $\frac{1}{8}''$ diameter. With regard to the size of the aluminum particles utilized best results have been obtained by using aluminum globules preferably having an aluminum purity greater than 97% which pass through a 6 mesh Tyler standard screen and are retained on a 20 mesh Tyler standard screen. A commercial grade of aluminum needles referred to a 200X may also be utilized, a sample of such needles will have about 1% retained on a 6 mesh Tyler screen and 99.5% retained on a 60 mesh Tyler screen. The individual aluminum particles may be in the form of wire, granules or powders and the particles are preferably less than one-quarter the final size of the individual homogeneous pellets comprising the composition.

From the foregoing it will be apparent that the size of the individual pellets comprising the improved drain cleaner composition of the present invention is controlled by the process of manufacture. My experimentation has shown that best results are achieved when the drain cleaner composition pellets are in a range of particle sizes from about $\frac{1}{8}''$ to $1''$ diameter, with optimum results when the pellets are in the size range of from about $\frac{1}{8}''$ to $\frac{1}{2}''$ diameter. The larger sizes have a longer induction period before reaction when contacted with water and it has been found most desirable to have a range of pellet sizes rather than all the pellets being in a single size. By sizing of the individual pellets as well as blending pellets of varying sizes it is possible to selectively control the induction period so as to provide a drain cleaner composition having the most desirable properties for the task at hand.

A typical relationship between the pellet size of a drain cleaner composition produced in accordance with the present invention and the time delay experienced in the maximum reaction of the pellets with water is set forth in the following table:

| Pellet size: | Induction period, minutes |
| --- | --- |
| Retained on a 2 mesh Tyler screen | 5 |
| Retained on a 3 mesh Tyler screen | 3.5 |
| Retained on a 4 mesh Tyler screen | 2.8 |
| Retained on a 6 mesh Tyler screen | 2.2 |
| Passing through a 6 mesh Tyler screen (fines) | 0.8 |
| Regular heterogeneous commercial drain cleaner composition | 0.4 |

The chemical composition of the homogeneous pellets comprising the improved drain cleaner composition of the present invention is preferably as follows:

| | Percent by weight |
| --- | --- |
| Caustic soda or caustic potash | 45–65 |
| Particulate aluminum | 5–10 |
| Sodium nitrate prills | 20–30 |
| Sodium chloride, sodium carbonate or sodium silicate | 5–20 |
| Wetting agents, etc., trace amounts. | |

Copper sulfate may be added or omitted without appreciable difference. A small amount of oil may be added to reduce hygroscopicity and a surfactant such as alkyl aryl sulfonate may be added to improve the wetting-out action of the composition during utilization thereof. Small quantities of talc or calcium stearate may be added to reduce the tendency of the pellets to cake.

The following example is intended to more clearly illustrate my invention.

EXAMPLE I

A typical composition of an improved drain cleaner composition manufactured in the form of homogeneous spherical pellets having a pellet size of from approximately 2 to 6 mesh Tyler standard would be:

| | Percent by weight |
| --- | --- |
| Caustic soda | 54.0 |
| Particulate aluminum | 7.5 |
| Sodium nitrate prills | 20.0 |
| Sodium chloride | 18.5 |

The components as set forth above are agglomerated by subjecting to a rolling action in the presence of sufficient moisture to cause the components to plasticize somewhat after which they ball up into pellets. Thus, when individual pellets are broken open it is found that they contain representative percentages of the several components. In addition, the granules of aluminum become embedded in the semi-solid matrix, preferably with some of the aluminum at or near the surface where reaction with the caustic can be initiated when the composition is wetted.

When one part of the pelletized drain cleaner composition of Example I is placed in about 3 to 4 parts of water, the water-soluble components, namely the caustic etc., react with the aluminum, generating large quantities of heat and ammonia gas. As indicated previously, the improved physical form of the drain cleaner composition produced in accordance with the present invention permits a delay in the induction of the aforementioned reaction thereby permitting the pellets to pass downwardly within a drain or the like which is filled with water without substantially reacting therewith, thus permitting the pellets to reach the general area of the impediment to be cleared from the drain line before any substantial reaction takes place. Accordingly, it may be seen that the pelletized drain cleaner composition of the present invention is safer, easier to handle, more economical and efficient in use than drain cleaner compositions known heretofore.

In summary, the advantages of the pelletized drain cleaner composition of the present invention may be listed as follows:

Safety

Flash back is avoided because of the introduction period prior to reaction, hydrogen gas generation is avoided because of prevention of segregation of the sodium nitrate and corrosive caustic particles do not have a tendency to stick to the hands of the person utilizing the composition;

Economy and performance

There is no waste due to reaction of the drain cleaner composition near the surface of the water within the drain therefore assuring that substantially all of the action afforded by the drain cleaner composition takes place close to the impediment within the drain. There is also a longer reaction period and, therefore, more prolonged heat generation because of extended release of components from the pellets.

Ease of handling

Dustiness and caking are avoided. Moreover, the loss of effectiveness due to piling up, i.e., heeling, in one spot and caking is avoided since water can penetrate into the voids established when the spherical pellets nest at the site of a drain impediment.

Accordingly, the improved physical form of the individual pellets ensures more complete reaction and better heat generation than possible with drain cleaner compositions known heretofore which attempted to overcome the problems attendant with the separation of the active components of compositions of this nature.

Inasmuch as the invention resides in the improved physical form of the drain cleaner composition such other and further alterations and modifications of the proportions of the several active ingredients of the composition are contemplated as would normally occur to those skilled in the art to which the invention relates.

What is claimed as new is as follows:

1. A homogeneous generally spherical pelletized drain cleaner composition wherein the pellets contain representative proportions of each component of the composition to provide a controlled in situ reaction to liberate heat when added to water to clear a drain line impediment comprising, by weight, from about 45% to about 65% of an alkaline agent selected from the group consisting of sodium hydroxide and potassium hydroxide, from about 5% to about 10% particulate aluminum, and from about 20% to 30% sodium nitrate, said spherical pellets having a size range of from about 2 mesh Tyler to about 6 mesh Tyler.

2. A homogeneous generally spherical pelletized drain cleaner composition wherein the pellets contain representative proportions of each component of the composition to provide a controlled induction period before in situ reaction to liberate heat when added to water within a drain and the like to clear an impediment from the line comprising, by weight, from about 45% to about 65% of an alkali metal hydroxide, from about 5% to about 10% aluminum in particulate form, and from about 20% to 30% alkali metal nitrate, said spherical pellets having a size range of from about 2 mesh Tyler to about 6 mesh Tyler.

3. A drain cleaner composition which comprises a plurality of homogeneous generally spherical pellets having a size range of from about 2 mesh Tyler screen to about 6 mesh Tyler screen, said homogeneous pellets having a composition, by weight, of from about 45% to about 65% of an alkali metal hydroxide, from about 5% to about 10% aluminum in particulate form, and from about 20% to about 30% alkali metal nitrate.

4. The particulate drain cleaner of claim 3 wherein said pellets further include, by weight, from about 5% to about 20% of filler material selected from the group consisting of sodium chloride, sodium carbonate, sodium silicate and admixtures thereof.

5. A method for preparing a drain cleaner composed of generally spherical pellets comprising, on the basis of weight, from about 45% to about 65% of an alkali metal hydroxide, from about 5% to about 10% particulate aluminum, and from about 20% to 30% alkali metal nitrate comprising the steps of: mixing the alkali metal hydroxide, particulate aluminum and alkali metal nitrate to form a homogeneous mixture; forming the homogeneous mixture into generally spherical pellets by the action of a rotary pelletizing means to form pellets having representative proportions of alkali metal hydroxide, particulate aluminum, and alkali metal nitrate.

6. The product produced by the method of claim 5.

References Cited

UNITED STATES PATENTS

| | | | |
|---|---|---|---|
| 2,773,040 | 12/1956 | Walton | 252—157 |
| 2,997,444 | 8/1961 | Martin | 252—156 |
| 3,344,078 | 9/1967 | Graham et al. | 252—157 |

LEON D. ROSDOL, Primary Examiner

W. SCHULZ, Assistant Examiner

U.S. Cl. X.R.

23—313; 134—40; 252—193; 264—117